United States Patent Office

3,123,597
Patented Mar. 3, 1964

3,123,597
20-BIS-(HYDROXYMETHYL)-11-OXYGENATED-PREGNANES AND DERIVATIVES THEREOF
Daniel Bertin, Montrouge, Seine, Hubert Fritel, Paris, Georges Muller, Nogent-sur-Marne, Jean Mathieu, Montfermeil, Robert Joly, Montmorency, and Jean Jolly, Fontenay-sous-Bois, France, assignors to Roussel-UCLAF, Paris, France, a corporation of France
No Drawing. Filed Mar. 26, 1962, Ser. No. 182,679
Claims priority, application France July 8, 1959
32 Claims. (Cl. 260—239.5)

This invention relates to novel 20-bis-(hydroxymethyl)-pregnanes and the process of preparation thereof. The invention more particularly relates to 20-bis-(hydroxymethyl)-pregnanes selected from the group consisting of

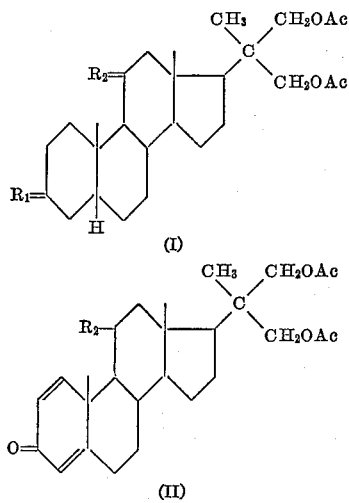

and

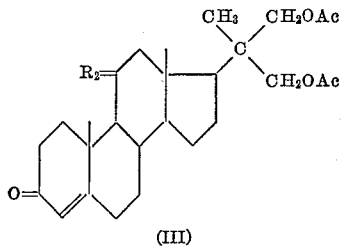

wherein $R_1$ is selected from the group consisting of =O and

$R_2$ is selected from the group consisting of =O and

and Ac is selected from the group consisting of hydrogen, an acyl radical of an organic carboxylic acid having 1 to 18 carbon atoms and an anion of a mineral acid.

In commonly assigned, copending application Serial No. 88,282, filed February 10, 1961, now Pat. No. 3,052,675, it is disclosed that 5α-pregnane compounds which are not oxygenated in the 11-position possess cardiotropic activity coupled with a dilation of the coronaries.

The products of the invention are distinguished by their cardiotropic activity coupled with a dilation action of coronaries. They are useful each time that a specific action on the heart muscle is necessary, this action being in addition accompanied with a beneficial augmentation of sanguinine irrigation of the said heart muscle.

It is an object of the invention to produce novel 20-bis-(hydroxymethyl)-11-oxygenated-pregnanes.

It is a further object of the invention to provide novel intermediates for the preparation of 20-bis-(hydroxymethyl)-11-oxygenated-pregnanes.

It is another object of the invention to provide novel processes for the preparation of 20-bis-(hydroxymethyl)-11-oxygenated-pregnanes.

It is an additional object of the invention to prepare pharmaceutical compositions comprising 20-bis-(hydroxymethyl)-11-oxygenated-pregnanes for the treatment of heart conditions.

The products of the invention are prepared starting from 3α-acetoxy-20-formyl-5β-pregnane-11-one which has a melting point of 190° C. The said compound undergoes the Tollens condensation with formol in the presence of alkaline agent such as alkali metal hydroxides or carbonates as catalyst to form 20-bis-(hydroxymethyl)-5β-pregnane-3α-ol-11-one which not only possesses cardiotropic activity with dilation action but is an intermediate for the preparation of the other compounds of Formula I.

A preferred process for the preparation of 20-bis-(hydroxymethyl)-5β-pregnane-3α-ol-11-one is to react 3α-acetoxy-20-formyl-5β-pregnane-11-one in an inert solvent such as a lower alkanol, especially methanol, with formaldehyde and potassium hydroxide at room temperature and recovering the desired product.

Upon reduction of 20-bis-(hydroxymethyl)-5β-pregnane-3α-ol-11-one in an inert organic solvent, 20-bis-(hydroxymethyl)-β-pregnane-3α,11β-diol is formed. Suitable reducing agents for the reduction are lithium aluminum hydride and alkali metal borohydrides such as potassium borohydride, sodium borohydride and lithium borohydride. An example of a suitable inert solvent for the reaction is tetrahydrofuran. The reaction scheme is outlined in Table I.

TABLE I

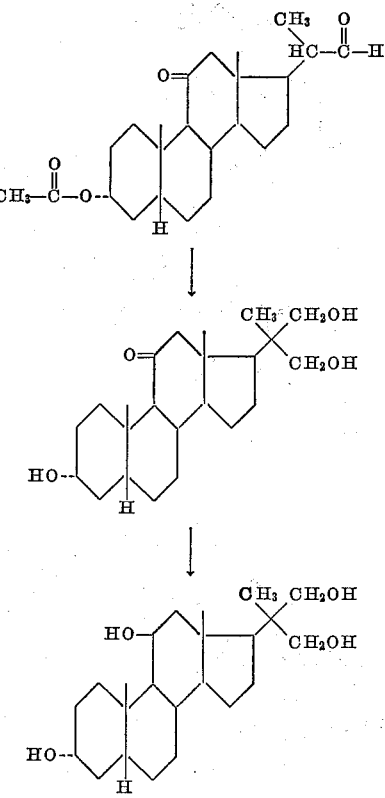

The process for the preparation of 20-bis-(acyloxymethyl)-5β-pregnane-3,11-diones comprises reacting 20-bis-(hydroxymethyl) - 5β - pregnane-3α-ol-11-one with a ketone or aldehyde to form the alkylidene or arylalkylidene of 20 - bis - (hydroxymethyl)-5β-pregnane-3α-ol-11-one, oxidizing the latter in the 3-hydroxy position to form the corresponding alkylidene or arylalkylidene of 20-bis-(hydroxymethyl)-5β-pregnane - 3,11 - dione, hydrolyzing said compound under acidic conditions to form 20-bis-(hydroxymethyl)-5β-pregnane-3,11-dione. The free alcohol may then be acylated with a mineral or organic acid to form the corresponding 20-bis-(acyloxymethyl)-5β-pregnane-3,11-dione.

A preferred process for the preparation of 20-bis-(acyloxymethyl)-5β-pregnane-3,11-diones comprises reacting 20-bis-(hydroxymethyl)-5β-pregnane-3α-ol-11-one with acetone at room temperature in the presence of perchloric acid to form the acetonide of 20-bis-(hydroxymethyl)-5β-pregnane-3α-ol-11-one, oxidizing said acetonide at a low temperature of the order of 0° to 10° C. with sulfochromic acid to form the acetonide of 20-bis-(hydroxymethyl)-5β-pregnane - 3,11 - dione, reacting the latter with a refluxing solution of sulfuric acid in ethanol to form 20-bis-(hydroxymethyl)-5β-pregnane-3,11-dione which can be reacted with fuming nitric acid at temperatures of 0° to —15° C. to form 20-bis-(nitratomethyl)-5β-pregnane-3,11-dione. Other acids may be used for the acylation. The reaction scheme is shown in Table II.

TABLE II

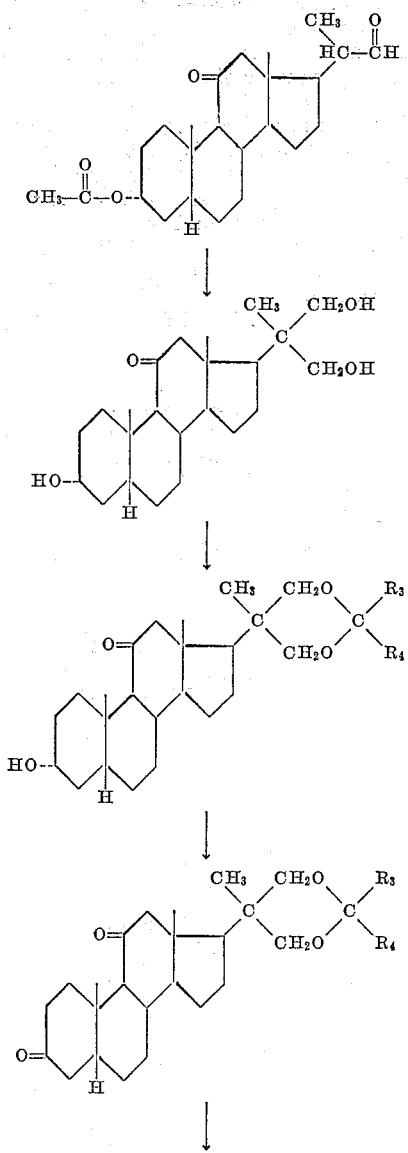

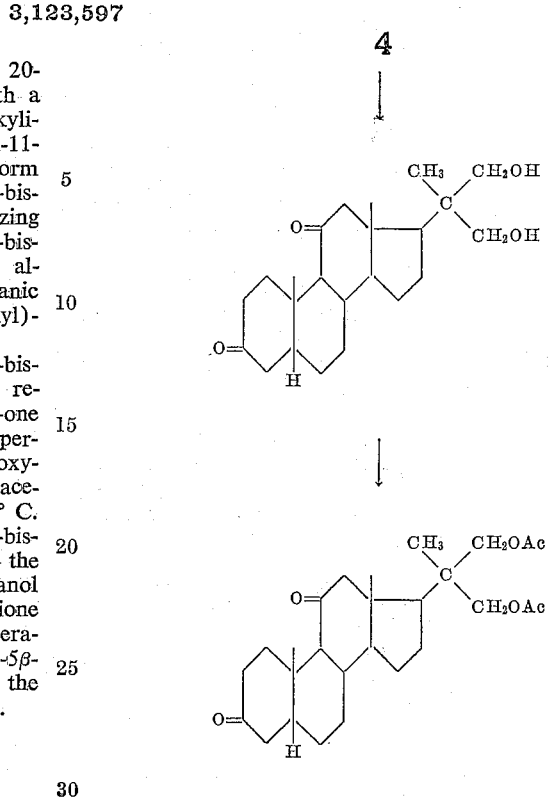

wherein $R_3$ and $R_4$ are selected from the group consisting of hydrogen, phenyl, phenyl-substituted lower alkyl and lower alkyl and Ac has the above definition.

Other 20-bis-(acyloxymethyl)-5β-pregnanes of the invention may be produced by preparing alkylidene or arylalkylidene of 20-bis-(hydroxymethyl) - 5β - pregnane-3α-ol-11-one as described above, acylating the latter with an acylating agent such as an acid anhydride in an inert solvent to form the alkylidene or arylalkylidene of 3α-acyloxy - 20 - bis - (hydroxymethyl)-5β-pregnane-11-one, hydrolyzing said product under acidic conditions to form 3α-acyloxy-20-bis - (hydroxymethyl) - 5β - pregnane-11-one, acylating the latter to form 3α-acyloxy-20-bis-(acyloxymethyl)-5β-pregnane-11-one, and saponifying the said compound to form 20-bis-(acyloxymethyl)-5β-pregnane-3α-ol-11-one. This compound may be acylated with a mineral acid or an organic acid to form another 3α-acyloxy-20-bis-(acyloxymethyl)-5β-pregnane-11-one or it may be reduced to form 20-bis-(acyloxymethyl)-5β-pregnane-3α,11β-diol.

A preferred process for the preparation of these compounds comprises preparing the acetonide of 20-bis-(hydroxymethyl) - 5β - pregnane - 3α - ol-11-one as described above, acetylating said acetonide with acetic acid anhydride in pyridine to form the acetonide of 3α-acetoxy-20-bis-(hydroxymethyl) - 5β - pregnane-11-one, reacting said product with aqueous acetic acid at room temperature to form 3α-acetoxy-20-bis-(hydroxymethyl)-5β-pregnane-11-one, reacting the latter with fuming nitric acid at temperatures between —5° and —15° C. to form 3α-acetoxy-20-bis-(nitratomethyl)-5β-pregnane-11-one and saponifying to form 20-bis-(nitratomethyl)-5β-pregnane-3α-ol-11-one.

20-bis-(nitratomethyl) - 5β-pregnane-3α-ol-11-one may be acylated with fuming nitric acid at low temperatures to form 3α-nitrato-20-bis-(nitratomethyl) - 5β - pregnane-11-one or may be acylated with sulfuric acid anhydride or sulfuric chlorhydrin in pyridine to form the pyridine salt of 3α-sulfato-20-bis-(nitratomethyl)-5β-pregnane-11-one which can be converted by double decomposition into its alkali metal salt.

The outline of the prepartion of these compounds is illustrated in Table III.

TABLE III

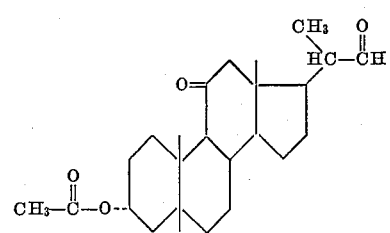

↓

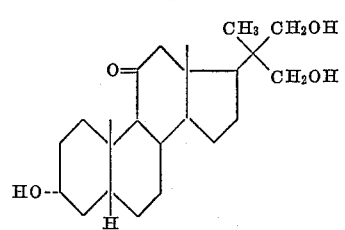

↓

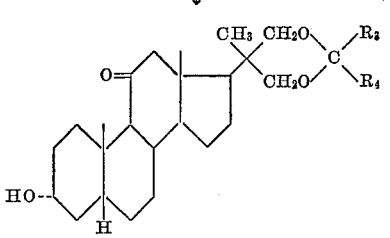

↓

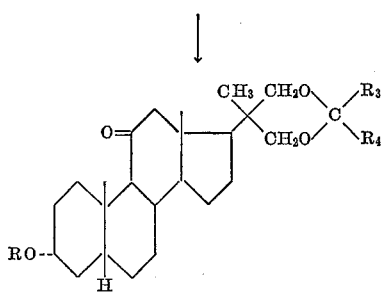

↓

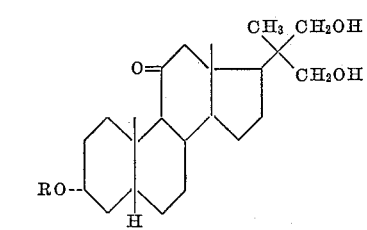

↓

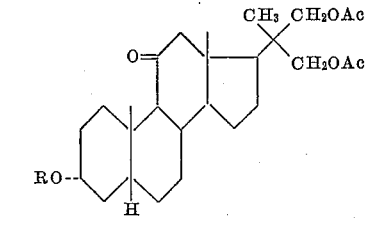

↓

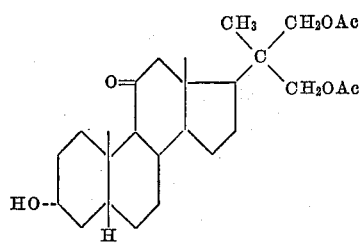

↓

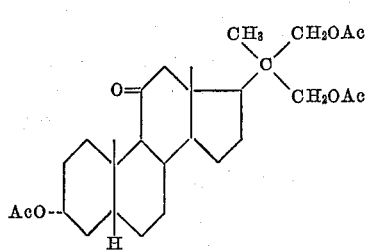

wherein $R_3$, $R_4$ and Ac have the above definitions and R is the acyl radical of an organic carboxylic acid having 1 to 18 carbon atoms.

The unsaturated compounds of Formula III are produced by forming the alkylidene or arylalkylidene of 20-bis-(hydroxymethyl) - 11 - oxygenated-5β-pregnane-3-one as described previously, reacting the latter under acidic conditions to form 20-bis-(hydroxymethyl) - 11 - oxygenated-5β-pregnane-3-one, acylating said compound with an organic acid to form 20-bis-(acyloxymethyl)-11-oxygenated-5β-pregnane-3-one, brominating the said product to form 4-bromo-20-bis-(acyloxymethyl)-11-oxygenated-5β-pregnane-3-one, dehydrobrominating the latter to form 20-bis - (acyloxymethyl) - 11 - oxygenated-$\Delta^4$-pregnene-3-one, saponifying the unsaturated compound to form 20-bis-(hydroxymethyl) - 11 - oxygenated-$\Delta^4$-pregnene-3-one which may be acylated with an organic carboxylic acid having 1 to 18 carbon atoms or with a mineral acid to form 20-bis-(acyloxymethyl)-11-oxygenated-$\Delta^4$-pregnene-3-one.

A preferred process for the preparation of the compounds of Formula III comprises forming the acetonide of 20-bis-(hydroxymethyl)-5β-pregnane-3,11-dione as decribed previously, refluxing the latter in ethanolic solution of sulfuric acid to form 20-bis-(hydroxymethyl)-5β-pregnane-3,11-dione, acylating said compound with acetic acid to form 20-bis-(acetoxymethyl)-5β-pregnane-3,11-dione, brominating the latter with a solution of bromine in acetic acid at temperatures about 50 to 70° C. to form 4 - bromo-20-bis-(acetoxymethyl)-5β-pregnane-3,11-dione, dehydrobrominating the said product with a mixture of lithium bromide and lithium carbonate in a di-lower alkyl carboxamide such as dimethylformamide to form 20-bis-(acetoxymethyl)-$\Delta^4$-pregnene-3,11-dione, saponifying the latter with alkali metal hydroxide at room temperature to form 20-bis-(hydroxymethyl)-$\Delta^4$-pregnene-3,11-dione which may be acylated by reacting with fuming nitric acid at temperatures about —5° and —15° C. to form 20-bis-(nitratomethyl)-$\Delta^4$-pregnene-3,11-dione. This reaction scheme is illustrated by Table IV.

TABLE IV

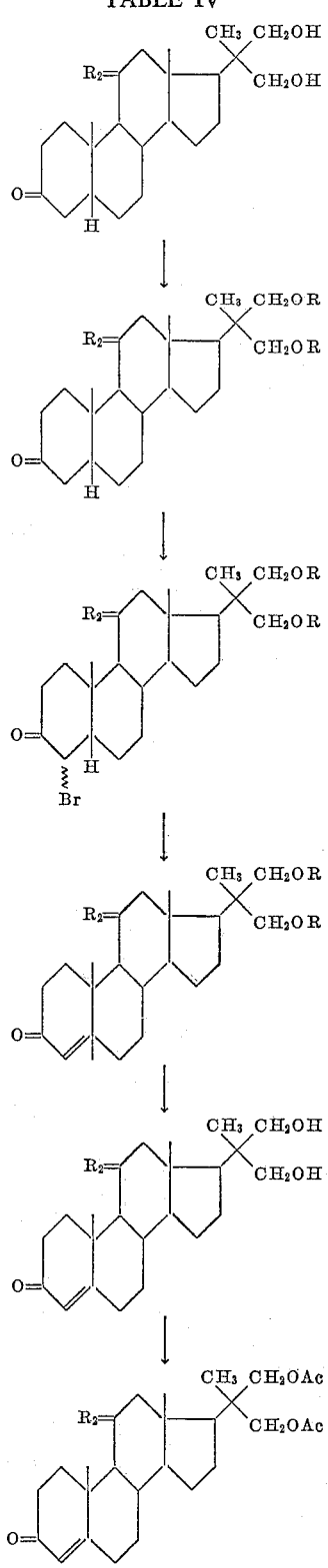

wherein R, $R_2$ and Ac have the above definitions.

The unsaturated compounds of Formula II may be prepared by forming 20-bis-(acyloxymethyl)-11-oxygenated-5β-pregnane-3-one as described previously, brominating the latter to form 2,4-dibromo-20-bis(acyloxymethyl)-11-oxygenated-5β-pregnane-3-one, dehydrobrominating the latter to form 20-bis-(acyloxymethyl)-11-oxygenated-$\Delta^{1,4}$-pregnadiene-3-one, saponifying the latter to form 20-bis-(hydroxymethyl)-11-oxygenated-$\Delta^{1,4}$-pregnadiene-3-one which may be acylated with an organic carboxylic acid having 1 to 18 carbon atoms or a mineral acid to form 20-bis-(acyloxymethyl)-11-oxygenated-$\Delta^{1,4}$-pregnadiene-3-one.

A preferred process for the preparation of the unsaturated compounds of Formula II comprises forming 20-bis-(acetoxymethyl)-11-oxygenated-5β-pregnane-3-one as previously described, brominating the latter with a solution of bromine in acetic acid to form 2,4-dibromo-20-bis-(acetoxymethyl)-11-oxygenated-5β-pregnane-3-one, dehydrobrominating said product with a mixture of lithium bromide and lithium carbonate in a solvent such as dimethylformamide to form 20-bis-(acetoxymethyl)-11-oxygenated-$\Delta^{1,4}$-pregnadiene-3-one, saponifying the latter with an alkaline solution to from 20-bis-(hyroxymethyl)-11-oxygenated-$\Delta^{1,4}$-pregnadiene-3-one which may be further acylated on acid such as fuming nitric acid to form the corresponding acylate such as 20-bis-(nitratomethyl)-11-oxygenated-$\Delta^{1,4}$-pregnadiene-3-one. Table V illustrates the method of preparation.

TABLE V

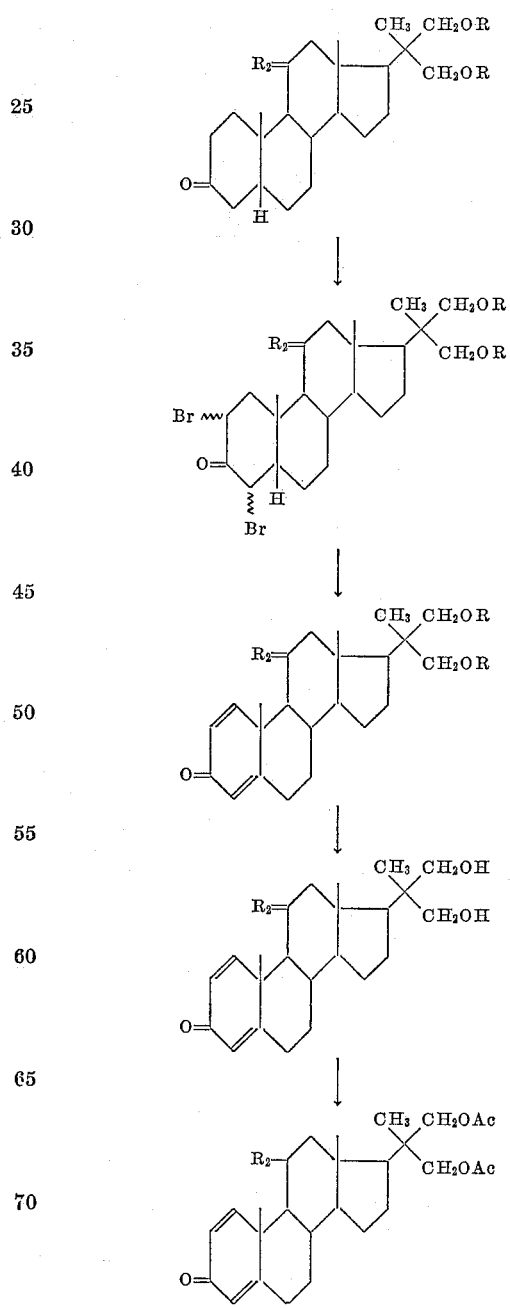

wherein R, $R_2$ and Ac have the above-definitions.

The 3α-phosphato-20-bis-(hydroxymethyl) - 5β - pregnane-11-one and its derivatives are prepared by reacting an alkylidene or arylalkylidene of 20-bis-(hydroxymethyl)-5β-pregnane-3α-ol-11-one with a dibenzyl halophosphonate to form the corresponding 3α-dibenzylphosphato derivative, hydrolyzing the latter under acidic conditions to form 3α - dibenzylphosphato-20-bis-(hydroxymethyl)-5β-pregnane-11-one, subjecting the latter to hydrogenolysis in the presence of a palladium catalyst to form 3α-phosphato-20-bis-(hydroxymethyl) - 5β - pregnane-11-one which can then be changed to its alkali metal salt or esterified with an organic carboxylic acid having 1 to 18 carbon atoms or a mineral acid.

A preferred process for the preparation of 3α-phosphato-20-bis-(hydroxymethyl)-5β-pregnane-11-one comprises reacting the acetonide of 20-bis-(hydroxymethyl)-5β-pregnane-3α-ol-11-one with dibenzyl chlorophosphonate in an ether solution to form the acetonide of 3α-dibenzylphosphato - 20 - bis - (hydroxymethyl)-5β-pregnane-11-one, hydrolyzing the latter with hydrochloric acid in an aqueous alcohol solvent to form 3α-dibenzylphosphato-20-bis-(hydroxymethyl)-5β-pregnane-11-one, subjecting the latter to hydrogenolysis in the presence of palladized carbon black in methanol to form 3α-phosphato-20-bis-(hydroxymethyl)-5β-pregnane-11-one. If the latter is reacted with sodium methanolate in methanol the disodium salt of 3α-phosphato-20-bis-(hydroxymethyl)-5β-pregnane-11-one is formed. If instead the said 3α-phosphato compound is reacted with an esterifying agent such as fuming nitric acid, the corresponding ester such as 3α - phosphato-20-bis-(nitratomethyl)-5β-pregnane-11- one is formed. The reaction is illustrated in Table VI. The alkali metal salts of 3α-phosphato-20-bis-(hydroxymethyl)-5β-pregnane-11-one are particularly adapted for administration by transcutaneous injection due to their water solubility.

TABLE VI

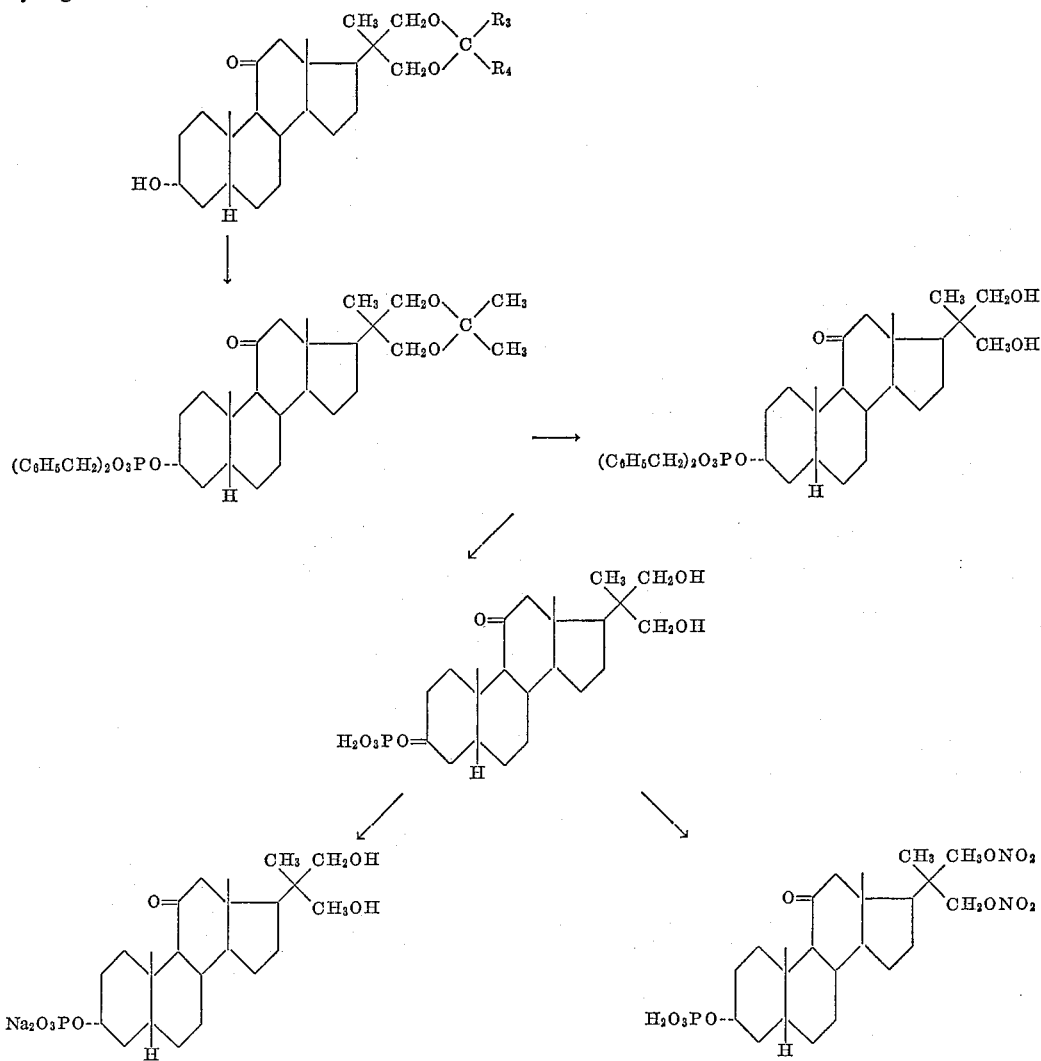

wherein R₃ and R₄ have the above definitions.

The terms "Ac" and "acyl" used hereinbefore may represent the acyl radical of an organic carboxylic acid having 1 to 18 carbon atoms or a mineral acid. Suitable organic carboxylic acids are alkanoic or alkenoic acids such as acetic acid, trimethylacetic acid, propionic acid, 4,4-dimethyl pentanoic acid, 10-undecenoic acid, cycloalkyl alkanoic acids such as β-cyclopentyl propionic acid; arylalkanoic acids such as phenyl propionic acid; cycloalkanoic acids such as hexahydrobenzoic acid and hexahydroterephthalic acid; and phenyl carboxylic acids such as benzoic acid and 3,5-dinitrobenzoic acid. Examples of suitable mineral acids are nitric acid, phosphoric acid and sulfuric acid.

The ketone or aldehyde reactant may be aliphatic or aromatic. Examples of suitable ketones are acetone, methylethyl ketone, ethylpropyl ketone and acetophenone. Examples of suitable aldehydes are formaldehyde, acetaldehyde, butyraldehyde, benzaldehyde and phenylacetaldehyde. When the aldehyde is aromatic such as benzaldehyde, the phenyl or phenylalkylidene of the 20-bis-(hydroxymethyl)-pregnanes can be transformed into the free 20-bis-(hydroxymethyl)-pregnanes by simple hydrogenolysis.

In the following examples there are several preferred embodiments to illustrate the invention. However, it should be understood that the invention is not intended to be limited to the specific embodiments.

*Example I.—Preparation of 20-Bis-(Hydroxymethyl)-5β-Pregnane-3α-Ol-11-One*

3 gm. of 20-formyl-3α-acetoxy-5β-pregnane-11-one, melting point=190° C., were introduced into a mixture of 30 cc. of methanol, 3 cc. of a 30% aqueous solution of formaldehyde and 1.5 cc. of a 50% potassium hydroxide solution. The mixture was stirred at 25° C. until solution was complete, then allowed to stand for sixteen hours at a temperature of 25° C. Thereafter, 100 cc. of water were added and the mixture was vacuum filtered. The filter cake was washed with water and dried in an oven at 100° C. 2.74 gm. (94%) of 20-bis-(hydroxymethyl)-5β-pregnane-3α-ol-11-one, having a melting point of 209° C. and a specific rotation $[\alpha]_D^{20} = +48 \pm 5$ (c.=0.5% in ethanol) were obtained.

The product, which is new, is found in the form of small colorless needles. It is insoluble in water, very slightly soluble in ether, benzene and chloroform, and soluble in alcohol.

*Analysis.*—$C_{23}H_{38}O_4$; molecular weight=378.54. Calculated: C, 72.97%; H, 10.12%. Found: C, 73.1%; H, 9.9%.

*Example II.—Preparation of 20-Bis-(Nitratomethyl)-5β-Pregnane-3α-Ol-11-One*

STEP A: PREPARATION OF ACETONIDE OF 20-BIS-(HYDROXYMETHYL)-5β-PREGNANE-3α-OL-11-ONE 8 gm. of 20-bis-(hydroxymethyl)-5β-pregnane-3α-ol-11-one were placed in suspension in 400 cc. of acetone, agitated at room temperature and 1.2 cc. of 65% perchloric acid was added. After complete solution of the steroid compound, the reaction mixture was allowed to stand at room temperature for two hours. Then 1.6 gm. of sodium bicarbonate and 800 cc. of ice water were added. The precipitate obtained was vacuum filtered at 0° C., washed with water and dried at 100° C.

The raw product was dissolved at reflux in ethanol containing 2% of pyridine. The solution was then treated with animal charcoal, filtered, concentrated and cooled for one hour at 0° C. The crystals obtained were washed with iced ethanol, then dried at 100° C. 5.8 gm. of the acetonide of 20-bis-(hydroxymethyl)-5β-pregnane-3α-ol-11-one were obtained, being a yield of 66%. The product had a melting point of 206.5° C. and a specific rotation of $[\alpha]_D^{20} = +30°$ C. (c.=1% in chloroform).

The product was soluble in acetone, benzene, chloroform and ethanol, insoluble in water and ether.

*Analysis.*—$C_{26}H_{42}O_4$; molecular weight=418.60. Calculated: C, 74.60%; H, 10.11%. Found: C, 74.3%; H, 10%.

This compound is not described in the literature.

The starting compound was prepared by the condensation of formol with 20-formyl-3α-acetoxy-5β-pregnane-11-one according to the Tollens reaction in the presence of potassium hydroxide.

STEP B: PREPARATION OF 3α-ACETOXY-20-BIS-(HYDROXYMETHYL)-5β-PREGNANE-11-ONE 5 gm. of the compound prepared in Step A were introduced into 30 cc. of pyridine and the solution was made lukewarm to effect its dissolution. The solution was then cooled to room temperature and 10 cc. of acetic anhydride were added.

The reaction mixture was allowed to remain for two hours at room temperature and was then poured into 300 cc. of slightly alkaline ice water (pH 8). The gummy precipitate obtained was extracted three times with 60 cc. aliquots of ether. The ethereal extracts were united, washed with water until the wash water was neutral, then dried over magnesium sulfate, filtered and evaporated to dryness under vacuum. A brown resin was obtained with a theoretical yield.

The resin obtained was introduced in 165 cc. of 60% acetic acid. The reaction mixture was agitated for thirty minutes at room temperature, then for one hour at 65–70° C. and the mixture was then cooled at room temperature. 300 mg. of animal charcoal were added, the mixture filtered and the filtrate washed with 60% acetic acid.

The combined filtrates were poured into 750 cc. of iced water. The gummy residue formed was extracted by ethyl acetate. The organic phase was washed successively with water, then with a 0.10 N sodium hydroxide solution and again with water, then dried over sodium sulfate and evaporated under vacuum.

A gummy residue was obtained which crystallized by titration with isopropyl ether. The crystalline precipitate was vacuum filtered at 0° C., washed with isopropyl ether and dried at 60° C.

Recrystallization was effected from carbon tetrachloride. 2.6 gm. of 3α-acetoxy-20-bis-(hydroxymethyl)-5β-pregnane-11-one were obtained, being a yield of 53% and had a melting point of 211° C. and a specific rotation $[\alpha]_D^{20} = +61.7°$ (c.=1% in chloroform).

The product was soluble in acetone, benzene, chloroform, ethanol, ether, slightly soluble in carbon tetrachloride, insoluble in water and dilute aqueous acids and alkalis.

*Analysis.*—$C_{25}H_{40}O_5$; molecular weight=420.57. Calculated: C, 71.39%; H, 9.50%. Found: C, 71.2%; H, 9.4%.

This compound is not described in the literature.

STEP C: PREPARATION OF 3α-ACETOXY-20-BIS-(NITRATOMETHYL)-5β-PREGNANE-11-ONE 3.2 cc. of 48° Bé. nitric acid were introduced slowly into 11.5 cc. of acetic anhydride cooled to −10° C. Then over a period of five minutes under agitation and under nitrogen at −10° C., a solution of 1 gm. of 3α-acetoxy-20-bis-(hydroxymethyl)-5β-pregnane-11-one in 6 cc. of chloroform was added. The agitation of the reaction mixture was continued for twenty minutes at a temperature between about −5 and −10° C. and then the mixture was poured under agitation in 100 cc. of iced water.

The aqueous phase was extracted with methylene chloride. The organic phase was washed successively with water, with a solution of 2% of sodium bicarbonate and again with water until the wash waters were neutral. The solution was filtered, dried over sodium sulfate and evaporated under vacuum. The gummy residue crystallized by addition of several drops of ethanol. It was homogenized by the addition of isopropyl ether and heating until boiling. The suspension was cooled, the crystals vacuum filtered and triturated with isopropylic ether, then dried at 50° C. 1.07 gm. of 3α-acetoxy-20-bis-(nitratomethyl)-5β-pregnane-11-one were obtained, being a yield of 88%. The product had a melting point of 135° C. and a specific rotation of $[\alpha]_D^{20} = 41.2°$ C. (c.=1% in dioxane).

The recrystallization can be effected in ethanol.

The product was soluble in acetone, benzene and chloroform, slightly soluble in ethanol and ether, insoluble in water.

*Analysis.*—$C_{25}H_{38}O_9N_2$; molecular weight=510.57. Calculated: C, 58.81%; H, 7.50%; N, 5.49%. Found: C, 58.7%; H, 7.4%; N, 5.4%.

This compound is not described in the literature.

STEP D: PREPARATION OF 20-BIS-(NITRATOMETHYL)-5β-PREGNANE-3α-OL-11-ONE 1.27 gm. of the compound prepared in Step C above were introduced into 50 cc. of ethanol, 3.7 cc. of water and 0.75 cc. of a 10 N sodium hydroxide solution. The reaction mixture was agitated under nitrogen at room temperature for three and one-half hours. The reaction mixture was then poured into 250 cc. of iced water. The raw product was extracted three times with 40 cc. aliquots of ether after addition of 20 cc. of a saturated sodium chloride solution.

The ethereal solution was washed with water, dried over sodium sulfate, filtered and evaporated under vacuum. The residue was dissolved in 2 cc. of toluene at 70° C., then cooled to room temperature in order to cause crystallization. The crystals obtained were vacuum filtered, washed with toluene and dried at 60° C. 1.21 gm. of 20-bis - (nitratomethyl)-5β-pregnane-3α-ol-11-one solvated with a half molecule of toluene were obtained, being a yield of 96%. The solvate had a melting point of 118° C. and a specific rotation $[\alpha]_D^{20}=+15.5°$ C. (c.=1% in dioxane).

The product was soluble in ethanol, ether, acetone and chloroform, slightly soluble in benzene, insoluble in water and dilute aqueous acids and alkalis.

*Analysis.*—$C_{23}H_{36}O_8N_2+\frac{1}{2}C_7H_8$; molecular weight= 514.60. Calculated: C, 61.85%; H, 7.83%; N, 5.44%. Found: C, 61.9%; H, 7.8%; N, 5.1%.

Toluene was eliminated in the following fashion: The solvate was dissolved in ethanol, the alcohol was distilled and ethanol was added anew. The solution was then concentrated, water added and allowed to remain overnight at 0° C. The precipitate was then vacuum filtered and dried at 60° C.

This compound is not described in the literature.

*Example III.—Preparation of 20-Bis-(Hydroxymethyl)-5β-Pregnane-3α,11β-Diol*

Into 30 cc. of tetrahydrofuran there were introduced 800 mg. of lithium aluminum hydride while maintaining the temperature at 18° C. by a water-ice bath. Then, over fifteen minutes at the same temperature, the following solution was added:

50 cc. of tetrahydrofuran
800 mg. of 20-bis-(hydroxymethyl)-5β-pregnane-3α-ol-11-one Then another 15 cc. of tetrahydrofuran were added and the reaction mixture was agitated for four hours at room temperature under nitrogen. The excess lithium aluminum hydride was destroyed by the addition of 16 cc. of ethyl acetate. About 18 cc. of a saturated solution of sodium chloride diluted in half was then introduced under agitation. The mineral precipitate formed was separated from the organic phase, then extracted with ethyl acetate. The organic solutions were combined and then washed with a saturated solution of sodium chloride diluted in half, dried over sodium sulfate and evaporated under vacuum.

The resin obtained was dissolved in 48 cc. of ethanol. The solution was filtered and concentrated to about 8 cc. and the resin was precipitated from the hot solution by the addition of 10 cc. of water. The precipitate was then vacuum filtered, washed with iced 50% alcohol and dried at 80° C.

The crystals obtained were dissolved in a mixture of toluene and alcohol. The solution obtained was concentrated and the product crystallized from solution by cooling. 374 mg. of 20-bis-(hydroxymethyl)-5β-pregnane-3α,11β-diol were obtained, being a yield of 48%. The said product had a melting point of 210° C. and a specific rotation $[\alpha]_D^{20}=+35.8°$ (c.=1% in ethanol).

By recovery of a second batch of crystals starting from the mother liquors of the alcohol purification, the yield was increased by 13%. This gave a total yield of 61%.

The product was soluble in alcohol, slightly soluble in toluene and acetone, insoluble in water, ether, benzene and chloroform.

*Analysis.*—$C_{23}H_{40}O_4$; molecular weight=380.55. Calculated: C, 72.59%; H, 10.59%. Found: C, 72.9%; H, 10.6%.

The compound is not described in the literature.

The starting compound was prepared by the condensation of formyl in the Tollens reaction on 20-formyl-3α-acetoxy-5β-pregnane-11-one in the presence of potassium hydroxide.

*Example IV.—Preparation of the 3-Potassium Sulfate of 20-Bis-(Nitratomethyl)-5β-Pregnane-3α-Ol-11-One*

500 mg. of 20-bis-(nitratomethyl)-5β-pregnane-3α-ol-11-one were dissolved in 5 cc. of chloroform and 2.5 cc. of anhydrous pyridine. Then, under agitation and under nitrogen at an interior temperature between 0 and +5° C., 14 cc. of a 1% solution of sulfuric chlorohydrin in chloroform were added. The reaction mixture was allowed to remain overnight under agitation and under nitrogen at room temperature. The reaction mixture was filtered and the precipitate was washed with chloroform. The filtrates were then reunited and 50 cc. of ether added thereto.

The gummy precipitate was separated, dried under vacuum, then taken up with 50 cc. of ether containing 2% ethanol and triturated until the appearance of crystals. The mixture was vacuum filtered and then washed several times with water. 545 mg. of the pyridene salt of the 3-sulfate of 20-bis-(nitratomethyl)-5β-pregnane-3α-ol-11-one were obtained having a melting point of about 160° C. upon recrystallization from ethanol.

The product obtained was dissolved in 65 cc. of ethanol and the solution was concentrated under vacuum in the presence of nitrogen and at room temperature until it reached a volume of about 10 cc. 0.75 cc. of a solution containing 11.4% potassium acetate in ethanol were then added. The reaction mixture was maintained for two hours under agitation at a temperature on the order of 0° C. Then it was vacuum filtered. The filter cake was washed by trituration with iced ethanol and anhydrous ether and the crystals were dried. 390 mg. of 3-potassium sulfate of 20-bis-(nitratomethyl)-5β-pregnane-3α-ol-11-one were obtained having a specific rotation $$[\alpha]_D^{20}=+31.4° C.$$

(c.=1% in water).

This compound was soluble in water, acetone, chloroform, ethanol and isopropanol, insoluble in ether and benzene.

*Analysis.*—$C_{23}H_{35}O_{11}N_2SK$; molecular weight=586.7. Calculated: C, 47.08%; H, 6.01%; K, 6.66%. Found: C, 47.1%; H, 6.0%; K, 6.5%.

This compound is not described in the literature.

The starting compound was prepared by blocking the hydroxyls of the methylenes of 20-bis-(hydroxymethyl)-5β-pregnane-3α-ol-11-one, followed by acetoxylation in the 3-position, deblockage of the primary hydroxyl groups, and finally nitration of these.

*Example V.—Preparation of 3α-Nitrato-20-Bis-(Nitratomethyl)-5β-Pregnane-11-One*

500 mg. of 20-bis-(hydroxymethyl)-5β-pregnane-3α-ol-11-one were introduced into 10 cc. of acetic anhydride and 2.6 cc. of fuming nitric acid cooled to −10° C. The mixture was agitated for twenty-five minutes at a temperature between about −5 and −10° C. and then the reaction mixture was poured into 100 cc. of iced water. The precipitate formed was agitated then for an hour at a temperature between about 0 and +5° C. The mixture was vacuum filtered and the filter cake was washed with a solution of 10% sodium dicarbonate, then with water until the wash waters were neutral, and dried under vacuum.

The raw product was purified by dissolution in acetic acid and precipitation by addition of water, then vacuum filtering, washing and drying, as has already been described above. 485 mg. of 3α-nitrato-20-bis-(nitratomethyl)-5β-pregnane-11-one were obtained. A further purification was effected by chromatography on silica gel and elution with methylene chloride containing 8–10% of carbon tetrachloride, then by dissolution in acetone or methanol, concentration of the filtered solution, addition of petroleum ether and crystallization.

A product was obtained whose melting point was 100–

105° C. and whose specific rotation was $[\alpha]_D^{20} = +42°$ ±3 (c.=1% in dioxane). It was soluble in acetone, benzene, chloroform, acetic acid and methylene chloride, soluble in the hot in alcohol, insoluble in water.

*Analysis.*—$C_{12}H_{25}O_{10}N_3$; molecular weight=513.53. Calculated: C, 53.8%; H, 6.87%; N, 8.18%. Found: C, 54.9%; H, 6.8%; N, 7.5%.

This compound is not described in the literature.

This starting compound was prepared by a condensation of formol on 20-formyl-3α-acetoxy-5β-pregnane-11-one by Tollens reaction in the presence of potassium hydroxide.

*Example VI.—Preparation of 20-Bis-(Nitratomethyl)-5β-Pregnane-3,11-dione*

STEP A: PREPARTION OF THE ACETONIDE OF 20-BIS-(HYDROXYMETHYL)-5β-PREGNANE-3,11-DIONE

3gm. of the acetonide of 20-bis-(hydroxymethyl)-5β-pregnane-3α-ol-11-one were dissolved in 600 cc. of pure acetone and the solution obtained was cooled until it reached a temperature between about 0 and +5° C. Then 1.85 cc. of the following sulfochromic solution was added under agitation and under nitrogen:

Chromic acid _____gm__ 13.36
Concentrated sulfuric acid _____cc__ 11.5
Water sufficient to make _____cc__ 50

The addition was made in three steps, with intervals of five minutes between each step.

The agitation was continued at the same temperature for ten minutes. 6 cc. of methanol and 6 gm. of dried sodium carbonate were added to the reaction mixture. The agitation was continued for another twenty minutes and the mixture was filtered. The residue was washed with acetone. The filtrate was decolorized by additon of 30 gm. of alumina under agitation for fifteen minutes, filtered again, 1 cc. of pyridine added to the filtrate and the solvents removed under vacuum. A resinous residue was obtained.

The resin was then dissolved in 7 cc. of methanol and the solution was cooled with ice for one hour. The crystals obtained were vacuum filtered, washed with isopropyl ether and dried at 60° C. 1.145 gm. of the acetonide of 20-bis-(hydroxymethyl)-5β-pregnane-3,11-dione were obtained. By working up of the product from the mother liquor, a second batch of the product was recovered with a weight of 0.59 gm. being a total of 1.735 gm.

The raw product was recrystallized from isopropyl ether and had a melting point of 175° C. and a specific rotation $[\alpha]_D^{20} = +36.5°$ (c.=1% in dioxane).

The product was present in the form of colorless crystals. It was soluble in alcohol, ether, acetone, benzene and chloroform, insoluble in water and in dilute aqueous alkalis. It was decomposed in dilute aqueous acids.

*Analysis.*—$C_{26}H_{40}O_4$; molecular weight=416.58. Calculated: C, 74.96%; H, 9.68%. Found: C, 74.9%; H, 9.7%.

This compound is not described in the literature.

The starting material was prepared by blocking the hydroxyls of the methylenes in the 20-position of 20-bis-(hydroxymethyl)-5β-pregnane-3α-ol-11-one.

STEP B: PREPARATION OF 20-BIS-(HYDROXYMETHYL)-5β-PREGNANE-3,11-DIONE 2 gm. of the acetonide of 20-bis-(hydroxymethyl)-5β-pregnane-3,11-dione were added under agitation to a solution of 1.6 cc. of normal sulfuric acid in 80 cc. of 50% ethanol. The reaction mixture was then carried to reflux for a period of about thirty minutes. Thereafter, it was neutralized with 290 mg. of sodium bicarbonate. 35 cc. of the alcohol was removed by distillation under vacuum and under agitation. Thereafter 30 cc. of water were added and the distillation continued. Oily drops were formed which were transformed into a gum and thereafter set up in a white precipitate. Another 20 cc. of water were then added and the mixture agitated for forty-five minutes at room temperature. The reaction mixture was then iced, vacuum filtered and the precipitate washed with water and dried at 60° C. 1.8 gm. of 20-bis-(hydroxymethyl)-5β-pregnane-3,11-dione were obtained.

The raw product was purified by solution at reflux in methanol, precipitation from warm solution by water and successive extractions with isopropyl ether at reflux temperature. This product had a melting point of 169° C. and a specific rotation $[\alpha]_D^{20} = +48.2° ±3$ (c.=1% in dioxane). It was present in the form of colorless crystals which were soluble in ethanol, acetone, benzene, chloroform and toluene, insoluble in water, ether and dilute aqueous acids and alkalis.

*Analysis.*—$C_{23}H_{36}O_4$; molecular weight=376.52. Calculated: C, 73.36%; H, 9.64%. Found: C, 73.2%; H, 9.6%.

This compound is not described in the literature.

STEP C: PREPARATION OF 20-BIS-(NITRATOMETHYL)-5β-PREGNANE-3,11-DIONE 1.6 cc. of 48° Bé. nitric acid were introduced slowly into 6 cc. of acetic anhydride cooled to −10° C. Thereafter, a solution of 500 mg. of 20-bis-(hydroxymethyl)-5β-pregnane-3,11-dione in 5 cc. of chloroform and 0.25 cc. of acetic acid were added slowly under agitation and under an atmosphere of nitrogen at a temperature between about −5° and −10° C. The reaction mixture was maintained under agitation and under nitrogen for a period of thirty minutes at a temperature between about −5 and −10° C. Then it was poured, always under agitation, into 60 cc. of iced water.

The aqueous layer was extracted with three 15 cc. aliquots of methylene chloride. The organic phases were combined, washed successively with water then with a 2% sodium bicarbonate solution, and again with water, until the wash waters were neutral. The organic solution was dried over sodium sulfate, filtered and evaporated to dryness. 540 mg. of 20-bis-(nitratomethyl)-5β-pregnane-3,11-dione were obtained, being a yield of 87%.

The raw product was purified by chromatography on silica gel with elution with methylene chloride, then recrystallized from carbon tetrachloride or isopropanol. The purified product had a melting point of 185–187° C. and a specific rotation $[\alpha]_D^{20} = +17° ±3$ (c.=1% in dioxane).

The product was present in the form of colorless crystals, soluble in acetone, benzene and chloroform, slightly soluble in alcohol, insoluble in water and dilute aqueous acids.

*Analysis.*—$C_{23}H_{34}O_8N_2$; molecular weight=466.52. Calculated: C, 59.21%; H, 7.35%; N, 6.01%. Found: C, 59.2%; H, 7.3%; N, 5.9%.

This compound is not described in the literature.

*Example VII.—Preparation of the 20-Bis-(Nitratomethyl)-Δ⁴-Pregnene-3,11-Dione*

STEP A: PREPARATION OF THE 20-BIS-(ACETOXYMETHYL)-5β-PREGNANE-3,11-DIONE 1.35 gm. of 20-bis-(hydroxymethyl)-5β-pregnane-3,11-dione were introduced into 8.1 cc. of pyridine and 2.7 cc. of acetic anhydride. The reaction mixture was maintained for a period of two hours at room temperature and then poured into 100 cc. of iced water. The gummy residue formed was extracted several times by benzene. The extracts were combined, then washed successively with a normal solution of hydrochloric acid, with water, with a N/10 normal solution of sodium hydroxide and finally with water, until the wash waters were neutral.

The organic phase was dried over sodium sulfate, filtered and evaporated to dryness under vacuum. The residue was taken up in ethanol and crystallized. 1.47 gm. of 20-bis-(acetoxymethyl)-5β-pregnane-3,11-dione were obtained which was recrystallized in aqueous ethanol. The purification was effected by a new recrystallization in the same solvent. The product had a melting point of 135° C. and a specific rotation $[\alpha]_D^{20} = +25.3°$ (c.=1% in dioxane).

The product was soluble in acetone, benzene and chloroform, soluble in the hot in ethanol, insoluble in water and ether.

*Analysis.*—$C_{27}H_{40}O_6$; molecular weight=460.59. Calculated: C, 70.40%; H, 8.75%. Found: C, 70.6%; H, 8.8%.

This compound is not described in the literature.

The starting compound was prepared by deblocking of the hydroxyls of the methylenes in the 20-position of the acetonide of 20-bis-(hydroxymethyl)-5β-pregnane-3,11-dione.

STEP B: PREPARATION OF THE 20-BIS-(ACETOXY-METHYL)-Δ⁴-PREGNENE-3,11-DIONE 1.578 gm. of 20-bis-(acetoxymethyl)-5β-pregnane-3,11-dione were introduced into 9.5 cc. of acetic acid and heated to 60° C.±2 in order to obtain a dissolution. Bromination was started by addition of two drops of hydrobromic acid, then introduction of 6.7 cc. of the following solution:

| | Cc. |
|---|---|
| Pure bromine | 1.5 |
| Acetic acid | 48.5 |

The bromination required thirty-five to forty minutes approximately and was effected at a temperature of 60°±2. The heating was stopped and after cooling 15 cc. of water were added and the solution was allowed to remain under agitation overnight at room temperature.

The gummy residue was vacuum filtered, washed with water until the wash water was neutral and dried under vacuum. Raw 4-bromo-20-bis-(acetoxymethyl)-5β-pregnane-3,11-dione was obtained, which was used as such for the following step of the synthesis. Its melting point was between 80 and 100° C.; percent bromine=15.3.

1.093 gm. of lithium bromide were introduced into 12.8 cc. of dimethylformamide. The solution was heated under agitation and under nitrogen to 80° C. and there is then added:

| | Gm. |
|---|---|
| Lithium carbonate | 0.890 |
| Above raw diacetate | 1.780 |

The reaction mixture was heated thereafter to a temperature between about 95 and 100° C. (interior temperature), always under agitation and a current of nitrogen. At the end of eighteen hours, the reaction mixture was cooled to room temperature and poured into a mixture of water and ice acidified by acetic acid and agitated for about one hour, then allowed to remain at rest for another hour.

The precipitate was vacuum filtered, washed with water and dried under vacuum. The raw product obtained was taken up and reacetylated for a period of two hours by:

| | Cc. |
|---|---|
| Pure anhydrous pyridine | 9.3 |
| Acetic anhydride | 3.1 | then poured into 125 cc. of a mixture of water and ice and extracted by methylene chloride. The extract was washed by a normal solution of hydrochloric acid, then with water, dried over sodium sulfate, treated with animal charcoal, filtered and evaporated to dryness under vacuum. A yellow resin was obtained which was taken up in 10 cc. of isopropyl ether.

The solution was cooled then for a period of one hour at a temperature between about 0 and +5° C. The crystals obtained were vacuum filtered, triturated with isopropyl ether and dried at 40° C. 0.776 gm. of 20-bis-(acetoxymethyl)-Δ⁴-pregnene-3,11-dione were obtained.

The product was also purified by chromatography on silica gel with elution by methylene chloride containing 8% acetone, then recrystallization from isopropyl ether. The pure product had a melting point of 132° C. and a specific rotation $[\alpha]_D^{20} = +134.4°$ (c.=0.5% in chloroform).

The product was soluble in alcohol, acetone, benzene, chloroform and isopropyl ether (in the hot), insoluble in water and dilute aqueous acids and alkalis.

*Analysis.*—$C_{27}H_{38}O_6$; molecular weight=458.57. Calculated: C, 70.71%; H, 8.35%. Found: C, 70.6%; H, 8.5%.

This compound is not described in the literature.

STEP C: PREPARATION OF 20-BIS-(HYDROXY-METHYL)-Δ⁴-PREGNENE-3,11-DIONE 750 mg. of the compound prepared in Step B were introduced into a mixture of 37.5 cc. of ethanol and 2.25 cc. of water. The mixture was agitated under nitrogen and 0.75 cc. of 30% sodium hydroxide solution were added. The solution obtained was agitated for a period of three and one-half hours, under nitrogen, at room temperature. The reaction mixture was then poured into 300 cc. of ice water and agitated for a period of thirty minutes at +5° C. The precipitate was vacuum filtered, washed with water until the wash water was neutral and dried at 80–100° C. 466 mg. of raw 20-bis-(hydroxymethyl)-Δ⁴-pregnene-3,11-dione were obtained which was purified by successive recrystallizations from ethanol.

Taking into account the recovery of purified product starting from the recrystallization mother liquors, a total yield of the order of 53% was obtained. The product had a melting point of 208° C. and a specific rotation $[\alpha]_D^{20} = +166°$ (c.=0.5% in chloroform).

The product was soluble in ethanol, acetone and chloroform, insoluble in water, ether and benzene.

*Analysis.*—$C_{23}H_{34}O_4$; molecular weight=374.5. Calculated: C, 73.76%; H, 9.15%; O, 17.09%. Found: C, 74.1%; H, 9.3%; O, 17.2%.

This compound is not described in the literature.

STEP D: PREPARATION OF 20-BIS-(NITROMETHYL)-Δ⁴-PREGNENE-3,11-DIONE 0.5 cc. of 48° Bé. nitric acid was introduced into 2 cc. of acetic anhydride under agitation and under nitrogen with a temperature between −15 and −20° C. Then 138 mg. of the compound prepared in Step C in 2 cc. of chloroform were added. The reaction mixture was maintained under agitation and under nitrogen for a period of twenty minutes at −10° C. The reaction mixture was thereafter poured into 25 cc. of ice water and the dinitrate was extracted with methylene chloride.

The organic phase was washed in turn with water, with a 2% sodium bicarbonate solution, then with water, until the wash water was neutral. The organic phase was then dried over sodium sulfate and the solvent distilled to dryness. A clear yellow resin was obtained which set up by the addition of methanol or of ethanol. The raw product was taken up with methylene chloride and chromatographed on silica gel with elution by methylene chloride containing 2% acetone. The resulting solution was treated with animal charcoal and evaporated to dryness. The residue was redissolved at reflux in ethanol, concentrated under vacuum, crystallized at room temperature and vacuum filtered. The precipitate was washed with iced ethanol and dried at 40° C.

110 mg. of 20-bis-(nitratomethyl)-Δ⁴-pregnene-3,11-dione were obtained, being a yield of 65%. The compound had a melting point of 144–146° C. and a specific rotation $[\alpha]_D^{20} = +104°±2.5$ (c.=0.5% in chloroform).

Ultraviolet spectra: λ max. (ethanol)=237 mμ (ε=15,300).

The product was soluble in acetone, benzene and chloroform, slightly soluble in ethanol, insoluble in water and ether.

*Analysis.* — $C_{23}H_{32}O_8N_2$; molecular weight=464.5. Calculated: C, 59.46%; H, 6.94%. Found: C, 59.6%; H, 7.0%.

This compound is not described in the literature.

*Example VIII.—Preparation of 20-Bis-(Nitratomethyl)-$\Delta^{1,4}$-Pregnadiene-3,11-Dione*

STEP A: PREPARTION OF 2,4-DIBROMO-20-BIS-(ACETOXYMETHYL)-5β-PREGNANE-3,11-DIONE 2 gm. of 20-bis-(acetoxymethyl)-5β-pregnane-3,11-dione were introduced into 20 cc. of acetic acid. Then under agitation and at a temperature between about 20 and 22° C. about 0.2 cc. of acetyl chloride were added and immediately thereafter, over a period of about ten minutes, 10 cc. of a solution of bromine in acetic acid (testing 14–14.2% bromine) were added. The reaction mixture was then poured into 300 cc. of a mixture of water and ice.

The crystals obtained were vacuum filtered, washed with water and dried. 2.649 gm. of 2,4-dibromo-20-bis-(acetoxymethyl)-5β-pregnane-3,11-dione were obtained having a bromine content of 26.6% (theoretical 25.89%). This compound was insoluble in water.

This compound is not described in the literature.

The starting compound was prepared by esterifying with acetic acid the hydroxymethylenic functions of 20-bis-(hydroxymethyl)-5β-pregnane-3,11-dione.

STEP B: PREPARATION OF 20-BIS-(ACETOXYMETHYL)-$\Delta^{1,4}$-PREGNADIENE-3,11-DIONE 1.1 gm. of lithium bromide were introduced into 18 cc. of dimethylformamide and the mixture was heated under agitation while bubbling nitrogen therethrough to 80° C. 1.1 gm. of lithium carbonate were added and thereafter 2.640 gm. of the compound prepared in Step A were added.

The reaction mixture was heated then to 95–100° C. under agitation and nitrogen for a period of about seventeen to eighteen hours. The reaction mixture was cooled to 20–25° C. and poured slowly into 180 cc. of a mixture of water and ice and 3.5 cc. of acetic acid. The precipitate was vacuum filtered, washed with water and dried.

The raw product was purified by trituration in boiling isopropyl ether, then by chromatography on silica gel with elutions with methylene chloride containing 6% and 8% acetone. The eluates were evaporated and the residue taken up by hot isopropyl ether and allowed to remain overnight at room temperature. The crystals obtained were vacuum filtered, washed with isopropyl ether and dried at 80° C.

0.935 gm. of 20-bis-(acetoxymethyl)$\Delta^{1,4}$-pregnadiene-3,11-dione were obtained, having a block melting point of 141–142° C. and an ultraviolet extinction of 15,200 at 239 m$\mu$.

The product was soluble in chloroform, slightly soluble in ether and isopropyl ether and insoluble in water.

This compound is not described in the literature.

STEP C: PREPARATION OF 20-BIS-(HYDROXYMETHYL)-$\Delta^{1,4}$-PREGNADIENE-3,11-DIONE 0.90 gm. of the compound prepared in Step B were introduced into 22 cc. of 95% ethanol and 2.7 cc. of water. The solution was maintained for a period of fifteen minutes at 20–22° C. while bubbling nitrogen therethrough. Then 0.9 cc. of sodium hydroxide solution were introduced. The reaction mixture was maintained for a period of three hours at about 20–22° C. under nitrogen. It was then neutralized by addition of acetic acid and poured into 300 cc. of a mixture of water and ice. The precipitate formed was vacuum filtered, washed with water and dried.

Purification of the raw product was made by dissolving the product in a refluxing mixture of ethyl acetate and ethanol, filtering the hot solution and recrystallizing at a temperature between about 0 and +5° C. 0.44 gm. of 20 - bis-(hydroxymethyl)-$\Delta^{1,4}$-pregnadiene-3,11-dione, having a melting point of 202–203° C., were obtained.

This compound was soluble in chloroform, slightly soluble in ether and ethyl acetate, insoluble in water.

It is not described in the literature.

STEP D: PREPARATION OF 20-BIS-(NITRATOMETHYL)-$\Delta^{1,4}$-PREGNADIENE-3,11-DIONE 1.52 cc. of fuming nitric acid were introduced slowly into 6.2 cc. of acetic anhydride, cooled to a temperature of between —15 and —20° C. Over a period of two to three minutes 0.420 gm. of the compound prepared in Step C in solution in 6.2 cc. of chloroform were added. The reaction mixture was maintained about twenty minutes under agitation and nitrogen bubbled therethrough at —10 to —15° C. and was then poured slowly into 75 cc. of a mixture of water and ice.

The precipitate formed was separated and the liquid was extracted several times with methylene chloride. The organic phases were combined, washed successively with water, with a 2% sodium bicarbonate solution, and with water until the wash water was neutral and then dried over magnesium sulfate.

The solvent was distilled under vacuum and the residue was poured into 25 cc. of water and ice and allowed to remain one hour under agitation. The 20-bis-(nitratomethyl)-$\Delta^{1,4}$-pregnadiene-3,11-dione crystallized and the crystals were vacuum filtered, washed with water and dried at 20° C.

The raw product was redissolved in refluxing ethanol and the solution was filtered while hot and allowed to crystallize in an ice box.

A new purification was effected in the same fashion by treatment with animal charcoal.

0.24 gm. of the pure product were obtained, having a melting point of 152–153° C. and a specific rotation $[\alpha]_D^{20}=+106°\pm 3$ (c.=0.5% in chloroform).

This compound was soluble in chloroform, soluble in the hot in ethanol, slightly soluble in ether, insoluble in water.

*Analysis.*—$C_{23}H_{30}N_2O_8$; molecular weight=462.49. Calculated: C, 59.72%; H, 6.53%; N, 6.05%. Found: C, 59.9%; H, 6.7%; N, 6.3%.

Ultraviolet spectra: $\lambda$ max. (ethanol) 238 m$\mu$ ($\epsilon$=14,900).

This compound is not described in the literature.

*Example IX.—Preparation of 3α-Phosphato-20-Bis-(Hydroxymethyl)-5-Pregnane-11-One*

STEP A: PREPARATION OF THE ACETONIDE OF 3α-DIBENYLPHOSPHATO - 20 - BIS- (HYDROXYMETHYL)-5β-PREGNANE-11-ONE 1.7 g. of the acetonide of 20-bis-(hydroxymethyl)-5β-pregnane-3α-ol-11-one, prepared in Step A of Example II, were dissolved in 17 cc. of pyridine. The mixture was cooled to —25° C. and 10 cc. of a solution of dibenzyl chlorophosphonate in ether were added. The mixture was agitated at —25° C. under an atmosphere of nitrogen for a period of about 1 hour and held overnight at —5° C. Next the suspension obtained was poured into 170 cc. of a mixture of ice and water. The aqueous suspension was agitated for a period of about 1 hour. Hydrochloric acid was added thereto to adjust the pH to a value of 4. Thereafter, the mixture was extracted with ether. The extracts were washed with water, dried over magnesium sulfate and evaporated to dryness. Raw acetonide of 3α-dibenzylphosphato - 20 - bis-(hydroxymethyl)-5β-pregnane-11-one was obtained which was used as such for the next step of the synthesis.

This compound is not described in the literature.

STEP B: PREPARATION OF 3α-DIBENZYLPHOSPHATO-20-BIS-(HYDROXYMETHYL)-5β-PREGNANE-11-ONE

The raw compound from Step A was taken up in a mixture of 20 cc. of ethanol and 1 cc. of 6 N hydrochloric acid. The mixture was agitated for about 2 hours and thereafter 200 cc. of water were added. The mixture was extracted with ethyl acetate. The extracts were washed with water, dried over magnesium sulfate and evaporated to dryness. Raw 3α-dibenzylphosphato-20-bis-(hydroxymethyl)-5β-pregnane-11-one was obtained which was purified by successive chromatography over magnesium silicate with elutions by a mixture of methylene chloride and methanol. 702 mg. of the product were obtained.

This compound is not described in the literature.

STEP C: PREPARATION OF 3α-PHOSPHATO-20-BIS-(HYDROXYMETHYL)-5β-PREGNANE-11-ONE 506 mg. of the compound prepared in Step B were introduced into 50 cc. of methanol. 100 mg. of palladized carbon black containing 10% of palladium were added and hydrogen was introduced for a period of about 6 minutes. Next the mixture was filtered and the filtrate was evaporated to dryness under vacuum. Raw 3α-phosphato-20-bis-(hydroxymethyl)-5β-pregnane-11-one was thus obtained and was moderately soluble in water and insoluble in chloroform.

This compound is not described in the literature.

The said compound was easily transformed into its disodium salt by the action of sodium methanolate with a methanolic solution of the raw compound obtained as above to obtain the disodium salt of 3α-phosphato-20-bis-(hydroxymethyl)-5β-pregnane-11-one.

This salt is very soluble in water and dilute aqueous alkalis, slightly soluble in dilute aqueous acids and methanol, insoluble in ether.

*Analysis.* — $C_{23}H_{37}O_7PNa_2H_2O$; molecular weight =520.50 (solvated product). Calculated: C, 53.07%; H, 7.55%; P, 5.95%. Found: C, 53.2%; H, 7.7%; P, 6.2%.

This compound is not described in the literature.

STEP D: PREPARATION OF 3α-PHOSPHATO-20-BIS-(NITRATOMETHYL)-5β-PREGNANE-11-ONE 0.4 cc. of fuming nitric acid were slowly introduced into 1.2 cc. of acetic acid anhydride cooled to a temperature between −10° C. and −15° C. Then at −10° C., 114 mg. of 3α-phosphato-20-bis-(hydroxymethyl)-5β-pregnane-11-one were added. The reaction mixture was held for a period of a half hour between −10° C. and −5° C. Then it was poured into 20 cc. of a mixture of water and ice and allowed to stand for a period of 1 hour. The precipitate formed was then separated, washed with water, vacuum filtered and dried under vacuum. 116 mg. of 3α-phosphato-20-bis-(nitratomethyl)-5β-pregnane-11-one were thus obtained having a melting point of 200° to 220° C. (with decomposition).

The compound was soluble in chloroform and dilute alkalis, moderately soluble in alcohol, very slightly soluble in water and dilute aqueous acids.

This compound is not described in the literature.

The 20-bis-(hydroxymethyl)-11-oxygenated-5β-pregnanes and their derivatives can be used by oral methods in the form of tablets or by parenteral methods in intramuscular injection in the form of aqueous or oily suspensions or even by venous methods in the form of a solution in an adequate excipient and by rectal methods.

They can be made in the form of injectable solutions, injectable suspension, put up in ampules or in flasks, in tablets and in suppositories.

*Preparation of Suitable Pharmaceutical Compositions Tablets Containing 0.5 Mg.*

In an appropriate mixer, there was introduced successively the active compound, white sugar, potato starch and lactose. On the homogenous mixture there was poured an aqueous solution of gelatin in a quantity sufficient to obtain a mixture capable of being granulated through a perforated metal die.

The granules obtained were placed on a perforated bed on a dish and put in a ventilated dryer at a temperature of 50° C. The dry granules were ground and passed through a metal screen of appropriate dimension, then mixed with talc and magnesium stearate for lubrication.

The granulated powder was transformed into tablets of adequate weight by mechanical pressure in a press. The tolerance of mean weight of a lot of ten tablets was ±5 per 100 of the theoretical weight. For ingestable commodities, it was found preferable that the weight of the tablets be not more than 750 mg. nor less than 80 mg. The percentage of active principal in the tablets was found preferably to be approximately between 0.6 and 6 per 1,000.

*Pharmacological Study of the 20-Bis-(Hydroxymethyl)-11-Oxygenated-5β-Pregnanes and Derivatives Thereof*

ACTION ON THE CORONARY BLOOD FLOW

Study of the action of the said compounds on the coronary blood flow was effected on the isolated heart of a rabbit, utilizing a technique inspired from Langendorff (Arch. gesam. Physiol., 1895, 61, 291). In this method, the heart was suspended by the aorta to a tube and the coronary system was perfused by means of this tube under a constant pressure of 5 cm. of mercury by a Locke serum having a pH of 7.2 to 7.3, heated to 37° C.

The compound being studied was placed in solution in ethanol and this solution was diluted by means of the Locke serum to the concentration usable. By a proper apparatus, the coronary blood flow was registered and parallelly the ventriculary contractions. The table below summarizes the results obtained by these compounds, as well as the results from trinitrine, papaverine, and other compounds under the same experimental conditions.

| Substance No. | Threshold Active concentration in γ/cc. | Increase of Coronary Blood Flow in Percent | Duration in mins. | Effect on the Ventriculary Contractions | |
|---|---|---|---|---|---|
| | | | | Amplitude in Percent | Frequency in Percent |
| I | 0.2 | 20 | >45 | ~0 | 0 |
| II | 0.05–0.1 | 10–15 | 8–15 | ~0 | −10 |
| III | 0.005–0.01 | 40–50 | 30–60 | +10 | −10 |
| IV | 0.1 | 30 | 20 | 0 | −16 |
| V | 0.05 | 20 | >20 | +20 | −5 |
| VI | 0.05 | 10 | 12 | +10 | −10 |
| VII | 0.05–0.1 | 10 | 10 | ~0 | 0 |
| VIII | 0.1 | 22 | >15 | ~0 | −11 |
| IX | 0.01 | 70 | >40 | +25 | −20 |
| X | 0.001–0.005 | 30 | 15 | 0 | 0 |
| XI | 0.005 | 10–15 | 15 | 0 | 0 |
| XII | 0.05–0.1 | 10 | 10 | (¹) | 0 |
| XIII | 1.0 | 60 | >20 | −30 | +15 |
| XIV | 1.0 | 130 | >23 | −10 | −5 |
| XV | 1.0 | 100 | 10 | 0 | −4 |
| XVI | 0.5 | 25 | >10 | −15 | 0 |
| XVII | 1.0 | 20 | >18 | −40 | −10 |
| XVIII | 1.0 | 10 | 2–20 | 0 | −5 |
| XIX | 10.0 | 20 | 15–20 | 0 | 0 |

¹ Slight augmentation.

I. 20-bis-(hydroxymethyl)-5β pregnane-3α-ol-11-one.
II. 3α-acetoxy-20-bis-(hydroxymethyl)-5β-pregnane-11-one.
III. 20-bis-(nitratomethyl)-5β-pregnane-3α-ol-11-one.
IV. 20-bis-(hydroxymethyl)-5β-pregnane-3α-11β-diol.
V. 3α-nitrato-20-bis-(nitratomethyl)-5β-pregnane-11-one.
VI. 20-bis-(nitratomethyl)-5β-pregnane-3,11-dione.
VII. 20-bis-(acetoxymethyl)-Δ⁴-pregnene-3,11-dione.
VIII. 20-bis-(hydroxymethyl)-Δ⁴-pregnene-3,11-dione.
IX. 20 bis-(nitratomethyl)-Δ⁴-pregnene-3,11-dione.
X. 20-bis-(nitratomethyl)-Δ¹,⁴-pregnadiene-3,11-dione.
XI. Potassium salt of 3α-sulfato-20-bis-(nitratomethyl)-5β-pregnane-11-one.
XII. 20-bis-(acetoxymethyl)-5β-pregnane-3,11-dione.
XIII. Hydrobromide of papaverine.
XIV. Persantin.
XV. Tetranitrate of pentaerythritol.
XVI. Methyl-3-chromone.
XVII. Khellin.
XVIII. Trinitrine.
XIX. Papaverine.

ACUTE TOXICITY

Toxicity tests were made on mice of the Rockland strain weighing between 18 and 22 gm. The test compounds were used in suspensions containing 10 mg. per cc. in a dispersing solution. They were injected in this form by subcutaneous method in groups of ten mice in doses of 50, 100 and 200 mg./kg. respectively.

The animals were held under observation for one week.

No symptoms of intoxication and mortality were noted in the course of this period.

| Compound studied: | Devoid of toxicity, mg./kg. |
|---|---|
| II | 50 |
| III | 200 |
| IV | 100 |
| V | 100 |
| VI | 100 |
| VIII | 100 |
| IX | 100 |
| X | 100 |
| XI | 50 |
| XII | 100 |

While the compounds of the invention are useful in the treatment of angina of the chest and of the coronaritis, they also possess a peripheral vasodilatory action and antispasmodic activity and are therefore useful in treating asthma, bronchial spasms and arterial spasms.

The present application is a continuation-in-part application of application Serial No. 37,568, filed June 21, 1960, now abandoned, and application Serial No. 88,283, filed February 10, 1961, now abandoned.

Various modifications of the process of the products of the invention may be made without departing from the spirit or scope thereof, and it is to be understood that the invention be limited only as defined in the appended claims.

We claim:

1. A compound selected from the group consisting of

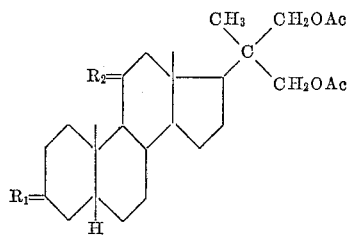

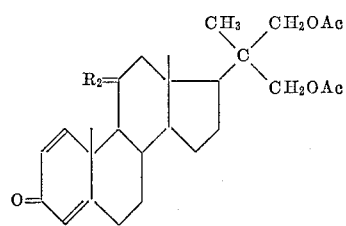

and

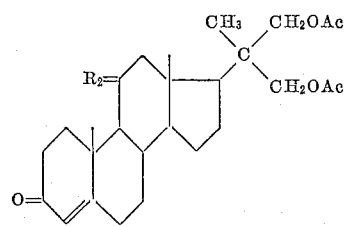

wherein $R_1$ is selected from the group consisting of $=O$ and

$R_2$ is selected from the group consisting of $=O$ and

and AC is selected from the group consisting of hydrogen, acyl radical of an organic carboxylic acid having 1 to 18 carbon atoms and an anion of a mineral acid.

2. 20-bis-(hydroxymethyl)-5β-pregnane-3α-ol-11-one.
3. 20-bis-(nitratomethyl)-5β-pregnane-3α-ol-11-one.
4. 3α - acetoxy - 20 - bis - (nitratomethyl) - 5β - pregnane-11-one.
5. 20 - bis - (hydroxymethyl) - $\Delta^{1,4}$ - pregnadiene-3,11-dione.
6. 20 - bis - (acetoxymethyl) - $\Delta^{1,4}$ - pregnadiene - 3,11-dione.
7. 20 - bis - (nitratomethyl) - $\Delta^{1,4}$ - pregnadiene - 3,11-dione.
8. 20 - bis - (hydroxymethyl) - 5β - pregnane - 3α,11β-diol.
9. 20-bis-(hydroxymethyl)-5β-pregnane-3,11-dione.
10. 20-bis-(nitratomethyl)-5β-pregnane-3,11-dione.
11. 20-bis-(nitratomethyl)-$\Delta^4$-pregnene-3,11-dione.
12. 20-bis(acetoxymethyl)-$\Delta^4$-pregnene-3,11-dione.
13. 20-bis-(hydroxymethyl)-$\Delta^4$-pregnene-3,11-dione.
14. 3α - nitrato - 20 - bis - (nitratomethyl) - 5β - pregnane-11-one.
15. 3α - sulfato - 20 - bis - (nitratomethyl) - 5β - pregnane-11-one.
16. The alkali metals salts of 3α-sulfato-20-bis-(nitratomethyl)-5β-pregnane-11-one.
17. The potassium salt of 3α-sulfato-20-bis-(nitratomethyl)-5β-pregnane-11-one.
18. The pyridine salt of 3α-sulfato-20-bis-(nitratomethyl)-5β-pregnane-11-one.
19. 20-bis-(acetoxymethyl)-5β-pregnane-3,11-dione.
20. 3α - acetoxy - 20 - bis - (hydroxymethyl) - 5β-pregnane-11-one.
21. 3α - phosphato - 20 - bis - (hydroxymethyl) - 5β-pregnane-11-one.
22. 3α - phosphato - 20 - bis - (nitratomethyl) - 5β-pregnane-11-one.
23. The disodium salt of 3α-phosphato-20-bis-(hydroxymethyl)-5β-pregnane-11-one.
24. A compound having the formula

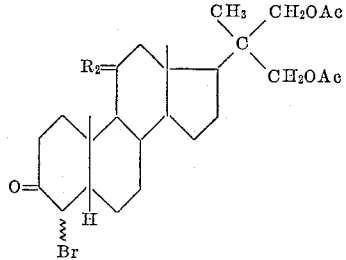

wherein $R_2$ is selected from the group consisting of $=O$ and

and Ac is selected from the group consisting of hydrogen, acyl radical of an organic carboxylic acid having 1 to 18 carbon atoms an anion of a mineral acid.

25. A compound having the formula

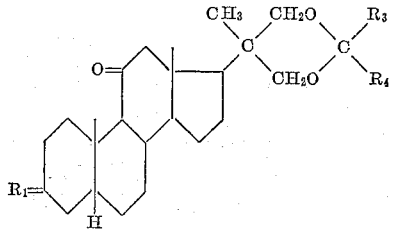

wherein $R_1$ is selected from the group consisting of $=O$, and

$R_3$ and $R_4$ are selected from the group consisting of hydrogen, phenyl, phenyl-substituted lower alkyl and lower alkyl radicals and Ac is selected from the group consisting of hydrogen, acyl radical of an organic carboxylic acid having 1 to 18 carbon atoms and an anion of a mineral acid.

26. A compound having the formula

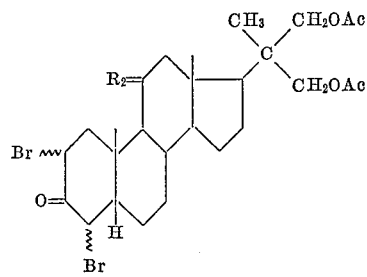

wherein $R_2$ is selected from the group consisting of =O and

and Ac is selected from the group consisting of hydrogen, acyl radical of an organic carboxylic acid having 1 to 18 carbon atoms and an anion of a mineral acid.

27. A process for the preparation of 20-bis-(hydroxymethyl)-5β-pregnane-3α,11β-diol which comprises condensing 3α-acetoxy-20-formyl-5β-pregnane-11-one with formaldeyde to form 20-bis-(hydroxymethyl)-5β-pregnane-3α-ol-11-one, reducing the latter to form 20-bis-(hydroxymethyl)-5β-pregnane-3α,11β-diol and recovering said product.

28. A process for the preparation of a compound having the formula

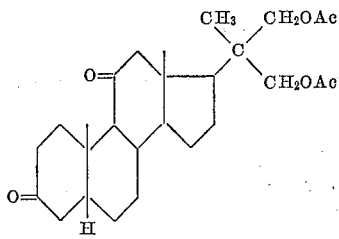

wherein Ac is selected from the group consisting of hydrogen, acyl radical of an organic carboxylic acid having 1 to 18 carbon atoms and an anion of a mineral acid which comprises condensing 3α-acetoxy-20-formyl-5β-pregnane-11-one with formaldehyde to form 20-bis-(hydroxymethyl)-5β-pregnane-3α-ol-11-one, reacting said compound with a member of the group consisting of O=CH—$R_3$ and

to form a compound having the formula

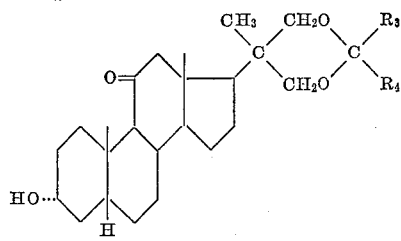

wherein $R_3$ and $R_4$ are selected from the groups consisting of hydrogen, phenyl, phenyl substituted lower alkyl and lower alkyl, oxidizing said compound to form a compound having the formula

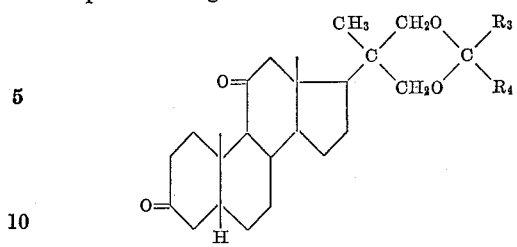

wherein $R_3$ and $R_4$ have the above definitions, hydrolyzing the latter under acidic conditions to form 20-bis-(hydroxymethyl)-5β-pregnane,3,11-dione and recovering the desired products.

29. A process for the preparation of a compound having the formula

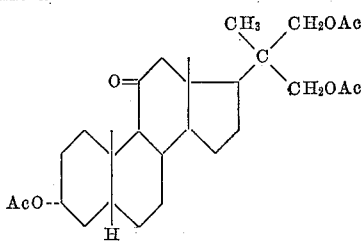

wherein Ac is selected from the group consisting of hydrogen, acyl radical of an organic carboxylic acid having 1 to 18 carbon atoms and an anion of a mineral acid which comprises reacting 3α-acetoxy-20-formyl-5β-pregnane-11-one with formaldehyde to form 20-bis-(hydroxymethyl)-5β-pregnane-3α-ol-11-one, reacting said product with a member selected from the group consisting of O=CH—$R_3$ and

to form a compound having the formula

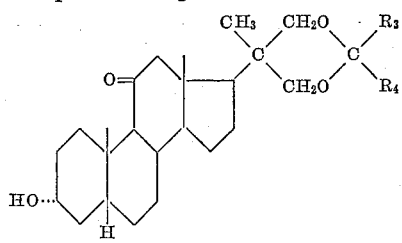

wherein $R_3$ and $R_4$ are selected from the groups consisting of hydrogen, phenyl, phenyl-substituted lower alkyl and lower alkyl, reacting the latter with an acylating agent to form a compound having the formula

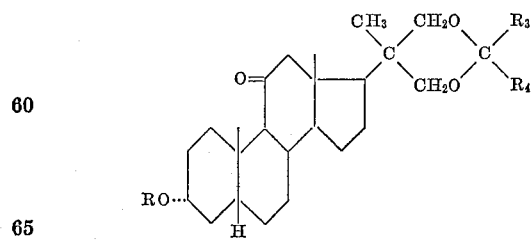

wherein R is an acyl radical of an organic carboxylic acid having 1 to 18 carbon atoms and $R_3$ and $R_4$ have the above definitions, hydrolyzing the latter under acidic conditions to form 3α-acyloxy-20-bis-(hydroxymethyl)-5β-pregnane-11-one, reacting the latter with an acylating agent to form 3α-acyloxy-20-bis-(acyloxymethyl)-5β-pregnane-11-one, saponifying the latter to form 20-bis-(acyloxymethyl)-5β-pregnane 3α-ol-11-one and recovering the desired compound.

30. A process for the preparation of a compound having the formula

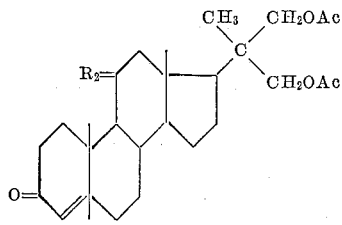

wherein $R_2$ is selected from the group consisting of =O and

and Ac is selected from the group consisting of hydrogen, acyl radical of an organic carboxylic acid having 1 to 18 carbon atoms and an anion of a mineral acid which comprises reacting 20-bis-(hydroxymethyl)-11-oxygenated-5β-pregnane-3-one with an acylating agent to form 20-bis-(acyloxymethyl)-11-oxygenated-5β-pregnane-3-one, brominating the latter to form 4-bromo-20-bis - (acyloxymethyl) - 11 - oxygenated - 5β- - pregnane-3-one, dehydrobrominating the said compound to form 20 - bis - (acyloxymethyl) - 11 - oxygenated - Δ⁴ - pregnene-3-one, saponifying the latter to form 20-bis-(hydroxymethyl)-11-oxygenated-Δ⁴-pregnane-3-one and recovering the desired compound.

31. A process for the preparation of a compound having the formula

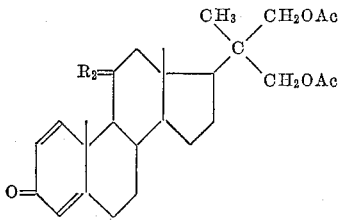

wherein $R_2$ is selected from the group consisting of =O and

Ac is selected from the group consisting of hydrogen, acyl radical of an organic carboxylic acid having 1 to 18 carbon atoms and an anion of a mineral acid which comprises brominating 20-bis-(acyloxymethyl)-11-oxygenated-5β-pregnane-3-one to form 2,4-dibromo-20-bis-(acyloxymethyl) - 11 - oxygenated - 5β - pregnane - 3 - one, dehydrobrominating the latter to form 20-bis-(acyloxymethyl)-11-oxygenated-$\Delta^{1,4}$-pregnadiene-3-one, saponifying the latter to form 20-bis-(hydroxymethyl)-11-oxygenated-$\Delta^{1,4}$-pregnadiene-3-one and recovering the desired product.

32. The process of claim 29 wherein a compound having the formula:

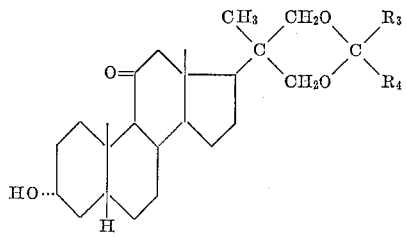

wherein $R_3$ and $R_4$ are selected from the groups consisting of hydrogen, phenyl, phenyl-substituted lower alkyl and lower alkyl, reacting the latter with an acylating agent to form a compound having the formula:

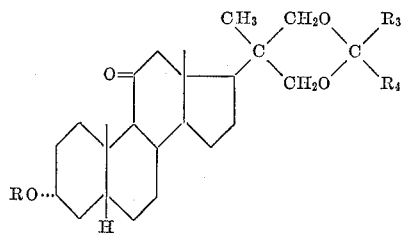

wherein R is the dibenzyphosphato radical and $R_3$ and $R_4$ have the above definition, hydrolyzing the latter under acidic conditions to form 3α-dibenzylphosphato-20-bis-(hydroxymethyl) - 5β-pregnane - 11 - one, hydrogenolyzing the latter to form 3α-phosphate-20-bis-(hydroxymethyl)-5β-pregnane-11-one and recovering the desired compound.

No references cited.

UNITED STATES PATENT OFFICE
CERTIFICATE OF CORRECTION

Patent No. 3,123,597                              March 3, 1964

Daniel Bertin et al.

It is hereby certified that error appears in the above numbered patent requiring correction and that the said Letters Patent should read as corrected below.

Column 9, the extreme bottom left-hand formula, in the upper right-hand portion of the formula, and column 10, the extreme top right-hand formula, in the upper right-hand portion of the formula reading:

column 10, the extreme bottom right-hand formula, in the upper right-hand portion of the formula reading:

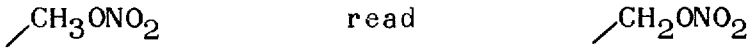

column 14, line 21, for "pyridene" read -- pyridine --; line 63, for "dicarbonate" read -- bicarbonate --; column 15, line 5, for "$C_{12}H_{25}O_{10}N_3$" read -- $C_{23}H_{35}O_{10}N_3$ --; line 9, for "This starting" read -- The starting --; column 20, lines 70 and 71, strike out "20-BIS-(HYDROXYMETHYL)-5β-PREGNANE-11-ONE STEP B: PREPARATION OF 3α-DIBENZYLPHOSPHATO-" and insert instead -- STEP B: PREPARATION OF 3α-DIBENZYLPHOSPHATO-20-BIS-(HYDROXYMETHYL)-5β-PREGNANE-11-ONE --; column 24, line 55, after "atoms" insert -- and --.

Signed and sealed this 5th day of January 1965.

(SEAL)
Attest:

ERNEST W. SWIDER                            EDWARD J. BRENNER
Attesting Officer                            Commissioner of Patents